US012726756B2

(12) United States Patent
Tsai

(10) Patent No.: US 12,726,756 B2
(45) Date of Patent: Sep. 1, 2026

(54) IMPEDANCE-TUNED MICROPHONE TUNNEL

(71) Applicant: Google LLC, Mountain View, CA (US)

(72) Inventor: Yuting Tsai, New Taipei City (TW)

(73) Assignee: Google LLC, Mountain View, CA (US)

( * ) Notice: Subject to any disclaimer, the term of this patent is extended or adjusted under 35 U.S.C. 154(b) by 72 days.

(21) Appl. No.: 18/889,160

(22) Filed: Sep. 18, 2024

(65) Prior Publication Data

US 2025/0016495 A1 Jan. 9, 2025

Related U.S. Application Data

(60) Provisional application No. 63/682,086, filed on Aug. 12, 2024.

(51) Int. Cl.

*H04R 1/28* (2006.01)
*H04R 1/04* (2006.01)
*H04R 1/08* (2006.01)

(52) U.S. Cl.

CPC ............ *H04R 1/2807* (2013.01); *H04R 1/04* (2013.01); *H04R 1/086* (2013.01); *H04R 2201/003* (2013.01)

(58) Field of Classification Search

CPC ........ H04R 1/086; H04R 1/2807; H04R 1/04; H04R 1/2838; H04R 2201/003; H04R 2499/11
USPC ........................................................ 381/91
See application file for complete search history.

(56) References Cited

U.S. PATENT DOCUMENTS

| | | | | |
|---|---|---|---|---|
| 2020/0389725 A1* | 12/2020 | Clyne | ...................... | H04R 1/04 |
| 2023/0146074 A1 | 5/2023 | Qureshi et al. | | |
| 2023/0254635 A1 | 8/2023 | Leahy et al. | | |

FOREIGN PATENT DOCUMENTS

| | | |
|---|---|---|
| CN | 213694057 U | 7/2021 |
| CN | 114175668 A | 3/2022 |
| WO | 2021242001 A1 | 12/2021 |
| WO | 2023199204 A1 | 10/2023 |

OTHER PUBLICATIONS

Tsai, Yuting, "Rib-Divided Speaker Back Chamber for Preventing Sound Absorbing Material Accumulation", Technical Disclosure Commons, https://www.tdcommons.org/dpubs_series/9707, Apr. 3, 2026, 11 pages.

* cited by examiner

*Primary Examiner* — Paul Kim
(74) *Attorney, Agent, or Firm* — Colby Nipper PLLC

(57) ABSTRACT

An impedance-tuned microphone tunnel for an electronic device is disclosed. The impedance-tuned microphone tunnel includes a ring-like structure having a central opening positioned within a microphone tunnel of an electronic device. The central opening of the ring-like structure has a diameter that is smaller than diameters of other central openings within the microphone tunnel. The ring-like structure may be used to tune an impedance of the microphone tunnel by varying the diameter of the central opening. In this way, the impedance of the microphone tunnel may be tuned to a frequency response target to reduce a resonant peak of the microphone tunnel. The ring-like structure may be coated with a non-stick material, such as with polyethylene terephthalate (PET), biaxially orientated polyethylene terephthalate (BoPET), polyimide (PI), and the like.

12 Claims, 5 Drawing Sheets

IMPEDANCE-TUNED MICROPHONE TUNNEL

CROSS-REFERENCE TO RELATED APPLICATION(S)

This application claims the benefit of U.S. Provisional Patent Application Ser. No. 63/682,086 filed on Aug. 12, 2024, the disclosure of which is incorporated by reference herein in its entirety.

SUMMARY

This document describes systems and techniques directed at an impedance-tuned microphone tunnel. The impedance-tuned microphone tunnel includes a ring-like structure ("ring") positioned within a microphone tunnel of an electronic device, and the ring includes a central opening that has a diameter that is smaller than the diameters of the central openings of the other various layers within the microphone tunnel. The ring may be circular, elliptical, hexagonal, or the like. The central opening of the ring may be circular, elliptical, hexagonal, or the like. In one aspect, the diameter of the central opening may be the largest diameter of the central opening. In another aspect, the diameter of the central opening may be the smallest diameter of the central opening. In some implementations, the largest diameter of the central opening may be substantially identical to the smallest diameter of the central opening.

The ring tunes an impedance of the microphone tunnel as described herein. For example, the impedance of the microphone tunnel may be tuned by varying the diameter of the central openings of the ring and a corresponding adhesive layer. Different rings and corresponding adhesive layers with different-sized central openings may be used to tune the impedance of the microphone tunnel to a frequency response target. The ring may be coated with a non-stick material such as with polyethylene terephthalate (PET), biaxially orientated polyethylene terephthalate (BoPET), polyimide (PI), or the like.

In one implementation, the techniques described herein relate to an apparatus including a first layer of adhesive with a first central opening having a first diameter. The apparatus includes a second layer of adhesive with a second central opening having a second diameter, the second diameter being substantially equal to the first diameter. The apparatus includes a waterproof membrane positioned between the first layer of adhesive and the second layer of adhesive, the waterproof membrane having a first outer diameter, the first outer diameter being larger than the first diameter and the second diameter. The apparatus includes a ring-like structure with a third central opening having a third diameter, the ring-like structure disposed on the second layer of adhesive effect to couple the ring-like structure to the waterproof membrane, the third diameter being smaller than the first and second diameters.

The apparatus may include a third layer of adhesive including a fourth central opening having a fourth diameter, the fourth diameter being substantially equal to the third diameter. The apparatus may include an acoustic mesh coupled to the ring by the third layer of adhesive, the acoustic mesh having a second outer diameter substantially equal to the first outer diameter. The system may include a fourth layer of adhesive including a fifth central opening having a fifth diameter, the fifth diameter being substantially equal to the first and second diameters. An impedance of the apparatus may be tuned by reducing or enlarging the third and fourth diameters.

The details of one or more implementations are set forth in the accompanying Drawings and the following Detailed Description. Other features and advantages will be apparent from the Detailed Description, the Drawings, and the Claims. This Summary is provided to introduce subject matter that is further described in the Detailed Description. Accordingly, a reader should not consider the Summary to describe essential features or limit the scope of the claimed subject matter.

BRIEF DESCRIPTION OF DRAWINGS

Apparatuses of and techniques for an impedance-tuned microphone tunnel are described with reference to the following drawings. The same numbers are used throughout the drawings to reference like features and components.

DETAILED DESCRIPTION

Overview

Figure 1:
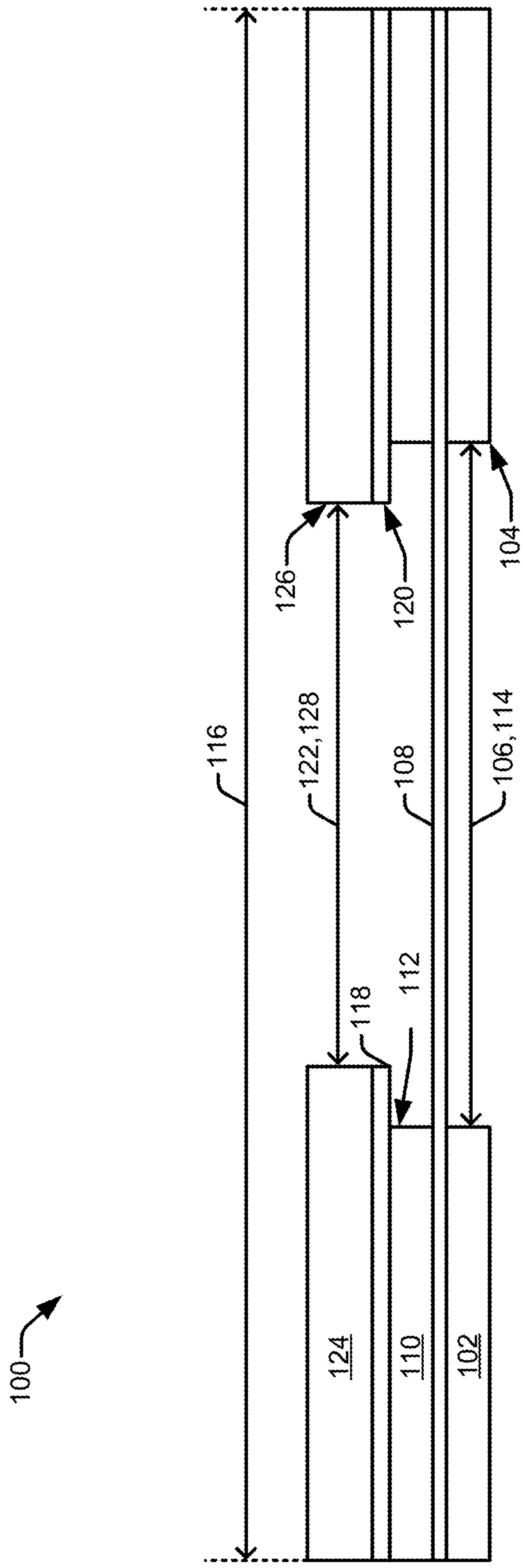
FIG. 1 illustrates a cross-sectional view of an example configuration of components that may be used to tune the impedance of a microphone tunnel.

Various electronic devices include one or more microphones. A housing (e.g., enclosure) of the electronic device includes a first aperture to enable sound waves to be received by the microphone. A printed circuit board (PCB) within the housing includes a second aperture substantially aligned with the first aperture to enable sound to be received by a microphone inlet of a micro-electromechanical system (MEMS) connected to the PCB. A volume (e.g., cavity) between the microphone inlet of the MEMS and the first aperture of the housing forms a microphone tunnel. A waterproof membrane may be positioned within the microphone tunnel to provide waterproof protection to the PCB and MEMS.

The configuration of the microphone tunnel may create a resonant peak that may create a clipped signal after an analog-to-digital converter (ADC). For example, if the resonant peak is larger than the maximum voltage of the ADC, the ADC may become saturated, resulting in a clipped signal, which is a form of distortion that reduces audio quality and may result in an unpleasant sound. In an attempt to suppress the resonant peak of the microphone tunnel, an acoustic dampening mesh may be included within the microphone tunnel. However, the addition of an acoustic dampening mesh may not be adequate to meet a frequency response target.

To this end, this document describes systems and techniques directed at an impedance-tuned microphone tunnel.

A microphone tunnel often includes an assembly of various layers that extend from one end of the microphone tunnel to the other end of the microphone tunnel. For example, various layers of adhesive may secure a waterproof membrane and other components, such as an acoustic mesh within the microphone tunnel. Each layer of adhesive has a central opening that enables sound waves to travel through the microphone tunnel. The microphone tunnel has an impedance that may have a resonant peak that results in a clipped signal. A ring and a corresponding layer of adhesive may be included within a microphone tunnel of an electronic device to alter the impedance of the microphone tunnel. The ring and corresponding layer of adhesive include central openings having a diameter that differs from the diameters of other central openings of the other layers of adhesive. This change in diameter of the central openings by the addition of the ring and corresponding layer of adhesive may alter the impedance of the microphone tunnel. The diameters of the ring and corresponding layer of adhesive are smaller in diameter than the other openings. In one implementation, the impedance of the microphone tunnel may be tuned to a frequency response target by the insertion of a ring and corresponding layer of adhesive having different-sized to gain the frequency response target.

The following discussion describes techniques that may be employed in the example operating apparatuses and environments. Although systems and techniques for an impedance-tuned microphone tunnel are described, it is to be understood that the subject of the appended Claims is not necessarily limited to the specific features or methods described. Rather, the specific features are disclosed as example implementations and reference is made to the operating environment by way of example only.

Example Apparatuses and Systems

A microphone tunnel of an electronic device often includes a central passageway having a generally uniform diameter through which sound waves travel from an external opening in the microphone tunnel to a microphone inlet of the electronic device. The central passageway forms a "tunnel" (e.g., cavity) within the electronic device. The dimensions of the microphone tunnel determine the impedance of the microphone tunnel having a resonant peak. If the resonant peak is large, audio quality may be negatively affected. The inclusion of a ring with a central opening having a diameter that differs from the diameter of the rest of the central passageway may be used to alter the impedance of the microphone tunnel to reduce the resonant peak of the microphone tunnel.

FIG. 1 illustrates an example apparatus 100 that may be used to tune the impedance of a microphone tunnel. The apparatus 100 includes a first layer of adhesive 102 that includes a first central opening 104. The first central opening 104 has a first diameter 106. The first layer of adhesive 102 is configured to couple the apparatus 100 to an electronic device as discussed herein. The apparatus 100 includes a waterproof membrane 108 coupled to the first layer of adhesive 102. The apparatus 100 includes a second layer of adhesive 110 that includes a second central opening 112. The second layer of adhesive 110 has a second diameter 114 that is substantially equal to the first diameter 106 of the first layer of adhesive 102. The waterproof membrane 108 is positioned between the first layer of adhesive 102 and the second layer of adhesive 110. The waterproof membrane 108 is configured to prevent liquid (e.g., water, moisture, or the like) from passing beyond the waterproof membrane 108 into the microphone tunnel of an electronic device into which the apparatus 100 may be installed. The waterproof membrane 108 has a first outer diameter 116 that is larger than the first and second diameters 106, 114 of the first and second layers of adhesive 102, 110.

The apparatus 100 includes a ring 118 that is coupled to the waterproof membrane 108 by the second layer of adhesive 110. The ring 118 includes a third central opening 120. The third central opening 120 has a third diameter 122. The ring 118 may be coated with a non-stick material such as PET, BoPET, PI, or the like. The apparatus 100 includes a third layer of adhesive 124 having a fourth central opening 126. The fourth central opening 126 has a fourth diameter 128 that is substantially identical to the third diameter 122. The third layer of adhesive 124 is configured to couple the ring 118 to a component within a microphone tunnel as discussed herein.

In one implementation, the first and second diameters 106, 114 may be 1.5 millimeters and the third and fourth diameters 122, 128 may be 1.2 millimeters. In another implementation, the first and second diameters 106, 114 may be 1.5 millimeters and the third and fourth diameters 122, 128 may be 1.0 millimeters. The first, second, third, and fourth diameters 106, 114, 122, and 128 may be varied depending on the application, such as, the third and fourth diameters 122, 128 being less than the first and second diameters 106, 114. The third and fourth diameters 122, 128 may be varied (e.g., enlarged or reduced) to tune the resonance of a microphone tunnel to a frequency response target. The first, second, and third layers of adhesive 102, 110, and 124, the ring 118, and the waterproof membrane 108 may not be drawn to scale, and the size, shape, number, and/or configuration may be varied as would be appreciated by one of ordinary skill in the art having the benefit of this disclosure. The third layer of adhesive 124 may be configured to couple the apparatus 100 within a microphone tunnel 202 of an electronic device as shown in FIG. 2.

Figure 2:
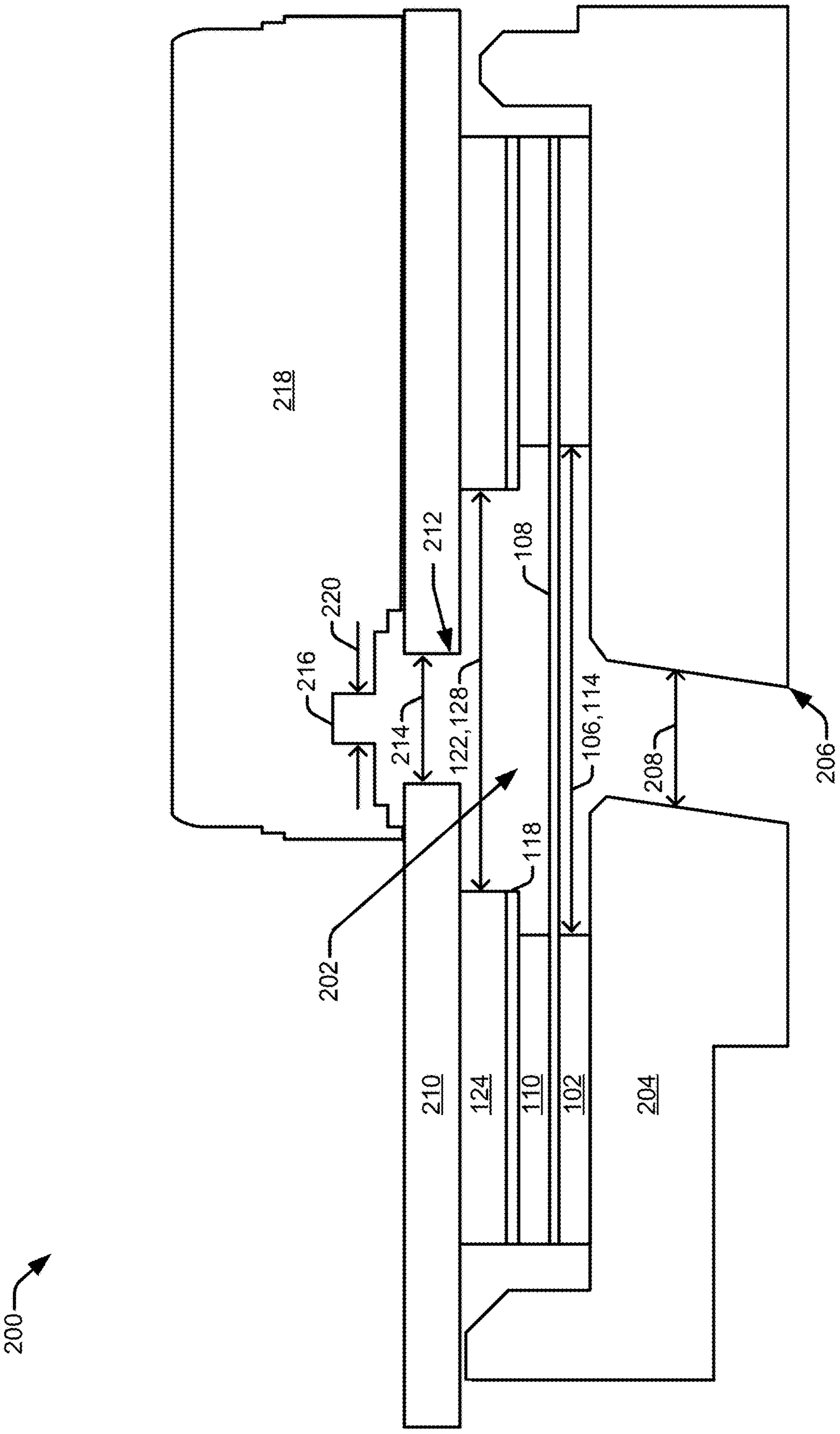
FIG. 2 illustrates a cross-sectional view of an example impedance-tuned microphone tunnel.

FIG. 2 illustrates a system 200 that includes a first layer of adhesive 102, a waterproof membrane 108, a second layer of adhesive 110, a ring 118, and a third layer of adhesive 124 positioned within a microphone tunnel 202 of an electronic device. The system 200 includes a housing (e.g., enclosure) 204 that includes a first aperture 206 having a first aperture diameter 208. The first aperture 206 is configured to enable sound waves to enter the microphone tunnel 202 within the housing 204. The first layer of adhesive 102 couples the waterproof membrane 108 to the housing 204. Only a portion of the housing 204 is illustrated in FIG. 2 for clarity purposes.

The system 200 includes a PCB 210 positioned within the housing 204. The PCB 210 includes a second aperture 212 having a second aperture diameter 214. The first and second apertures 206, 212 may be substantially axially aligned to enable sound waves outside of the housing 204 to enter and travel though the microphone tunnel 202 to a microphone inlet 216 formed in a MEMS 218 positioned within the housing 204 of the system 200. The microphone inlet 216 has an inlet diameter 220.

The housing 204 is positioned at one end of the microphone tunnel 202 with the PCB 210 being positioned at the other end of the microphone tunnel 202. The first aperture 206 of the housing 204 may be substantially axially aligned with the second aperture 212 of the PCB 210. Likewise, the microphone inlet 216 may be substantially axially aligned with both the first and second apertures 206, 212. The microphone tunnel 202 extends from the first aperture 206 in the housing 204 to the microphone inlet 216 formed in the MEMS 218. The volume (e.g., cavity) of the microphone tunnel 202 has an impedance having a resonant peak. The ring 118 and third layer of adhesive 124 are configured to reduce the resonant peak of the microphone tunnel 202, and the size of diameters 122, 128 of third and fourth central openings 120, 126 may be varied to tune the impedance of the microphone tunnel 202 to a frequency response target. As the third and fourth diameters 122, 128 of the third and fourth central openings 120, 126 (best shown in FIG. 1) are smaller in diameter (e.g., the first and second diameters 106, 114) than other central openings (e.g., the first and second central openings 104, 112), the ring 118 and the third layer of adhesive 124 change the impedance of the microphone tunnel 202.

In one implementation, the first and second diameters 106, 114 may be 1.5 millimeters, the third and fourth diameters 122, 128 may be 1.2 millimeters, the first and second aperture diameters 208, 214 may be 0.7 millimeters, and the inlet diameter 220 may be 0.325 millimeters. In another implementation, the first and second diameters 106, 114 may be 1.5 millimeters, the third and fourth diameters 122, 128 may be 1.0 millimeters, the first and second aperture diameters 208, 214 may be 0.7 millimeters, and the inlet diameter 220 may be 0.325 millimeters.

The size, shape, and/or configuration of the elements (e.g., the first layer of adhesive 102, the waterproof membrane 108, the second layer of adhesive 110, the ring 118, the third layer of adhesive 124, the housing 204, the PCB 210, the MEMS 218, the microphone inlet 216) of the system 200 may not be shown to scale and may be varied as would be appreciated by one of ordinary skill in the art having the benefit of this disclosure. For example, the first and second aperture diameters 208, 214, the first and second diameters 106, 114, the third and fourth diameters 122, 128, and the inlet diameter 220 may be varied depending on the application, with the third and fourth diameters 122, 128 being used to tune the resonance of the microphone tunnel 202. For example, different rings 118 and third layer of adhesives 124 having differing third and fourth diameters 122, 128 of the third and fourth central openings 120,126 may be repeatedly included in the system 200 until a frequency response target of the microphone tunnel 202 is achieved and the ring 118 that causes the frequency response target is retained. The elements (e.g., the first layer of adhesive 102, the waterproof membrane 108, the second layer of adhesive 110, the ring 118, the third layer of adhesive 124) positioned within the microphone tunnel 202 may be varied. For example, FIG. 3 illustrates an implementation of an apparatus 300 that may be positioned within a microphone tunnel 202 of an electronic device.

Figure 3:
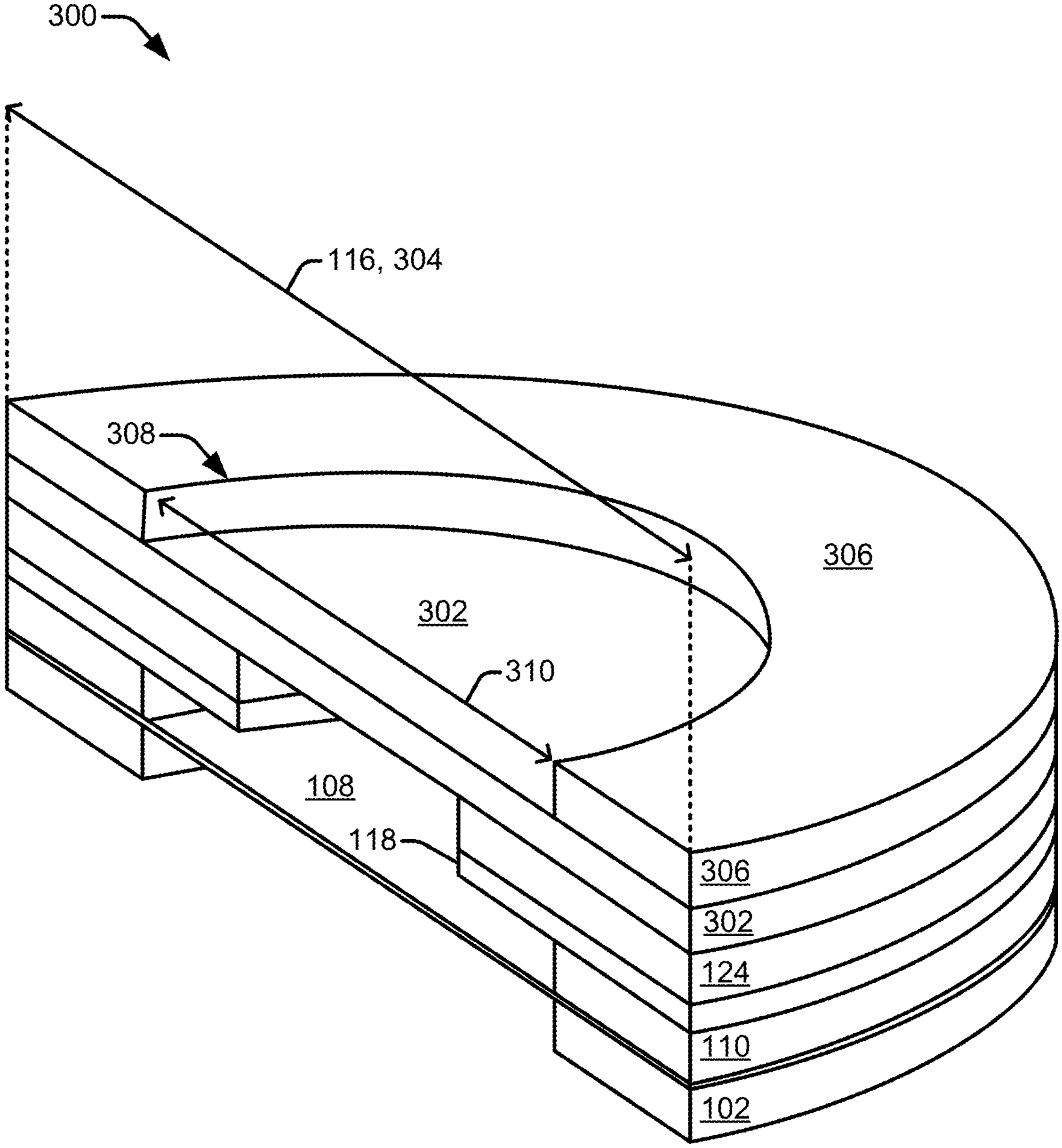
FIG. 3 illustrates a cross-sectional perspective view of an example configuration of components that may be used to tune the impedance of a microphone tunnel.

FIG. 3 illustrates an example apparatus 300 that may be used to tune an impedance of a microphone tunnel by the inclusion of different rings 118 and a corresponding adhesive layer 124 within the apparatus 300. The apparatus 300 includes a first layer of adhesive 102, a waterproof membrane 108 coupled to the first layer of adhesive 102, and a second layer of adhesive 110 also coupled to the waterproof membrane 108. The first layer of adhesive 102 is configured to couple the apparatus 300 within a microphone tunnel 202 (shown in FIGS. 2 and 4) of an electronic device as discussed herein. The apparatus 300 includes a ring 118 coupled to the waterproof membrane 108 by the second layer of adhesive 110. A third layer of adhesive 124 is coupled to the ring 118. The first and second layers of adhesive 102, 110 have first and second central openings 104, 112 having first and second diameters 106, 114 as discussed herein. The ring 118 and third layer of adhesive 124 have third and fourth central openings 120, 126 having third and fourth diameters 122, 128 that are smaller than the first and second diameters 106, 114. The third and fourth diameters 122, 128 of the ring 118 and the third layer of adhesive 124 may be used to tune an impedance of the microphone tunnel 202 to reduce the resonant peak of the microphone tunnel 202 as discussed herein. For example, a first ring 118 and the third layer of adhesive 124 having third and fourth diameters 122, 128 of the third and fourth central openings 120,126 may instead have a ring 118 and third layer of adhesive 124 having a different third and fourth diameters 122, 128 of their respective central openings 120,126. The third and fourth diameters 122, 128 may be varied by the insertion of different rings 118 and corresponding layers of adhesive 124 until the impedance of a microphone tunnel 202 corresponds to a frequency response target having a reduced resonant peak.

The apparatus 300 includes an acoustic mesh 302 coupled to the ring 118 by the third layer of adhesive 124. The acoustic mesh 302 has a second outer diameter 304 that is substantially equal to a first outer diameter 116 of the waterproof membrane 108. The acoustic mesh 302 provides dust protection for the microphone inlet 216. The acoustic mesh 302 may also be configured to reduce the resonant peak of the microphone tunnel 202. The first and second outer diameters 116, 304 may be configured to substantially fill the microphone tunnel 202 of the electronic device. The apparatus 300 includes a fourth layer of adhesive 306 configured to couple the acoustic mesh 302 to a component within an electronic device. The fourth layer of adhesive 306 includes a fifth central opening 308 having a fifth diameter 310. The fifth diameter 310 may be substantially identical to the first and second diameters 106, 114 of the first and second central openings 104, 112 of the first and second layers of adhesive 102, 110. The fourth layer of adhesive 306 may be configured to couple the apparatus 300 within the microphone tunnel 202 of the electronic device as shown in FIG. 4.

Figure 4:
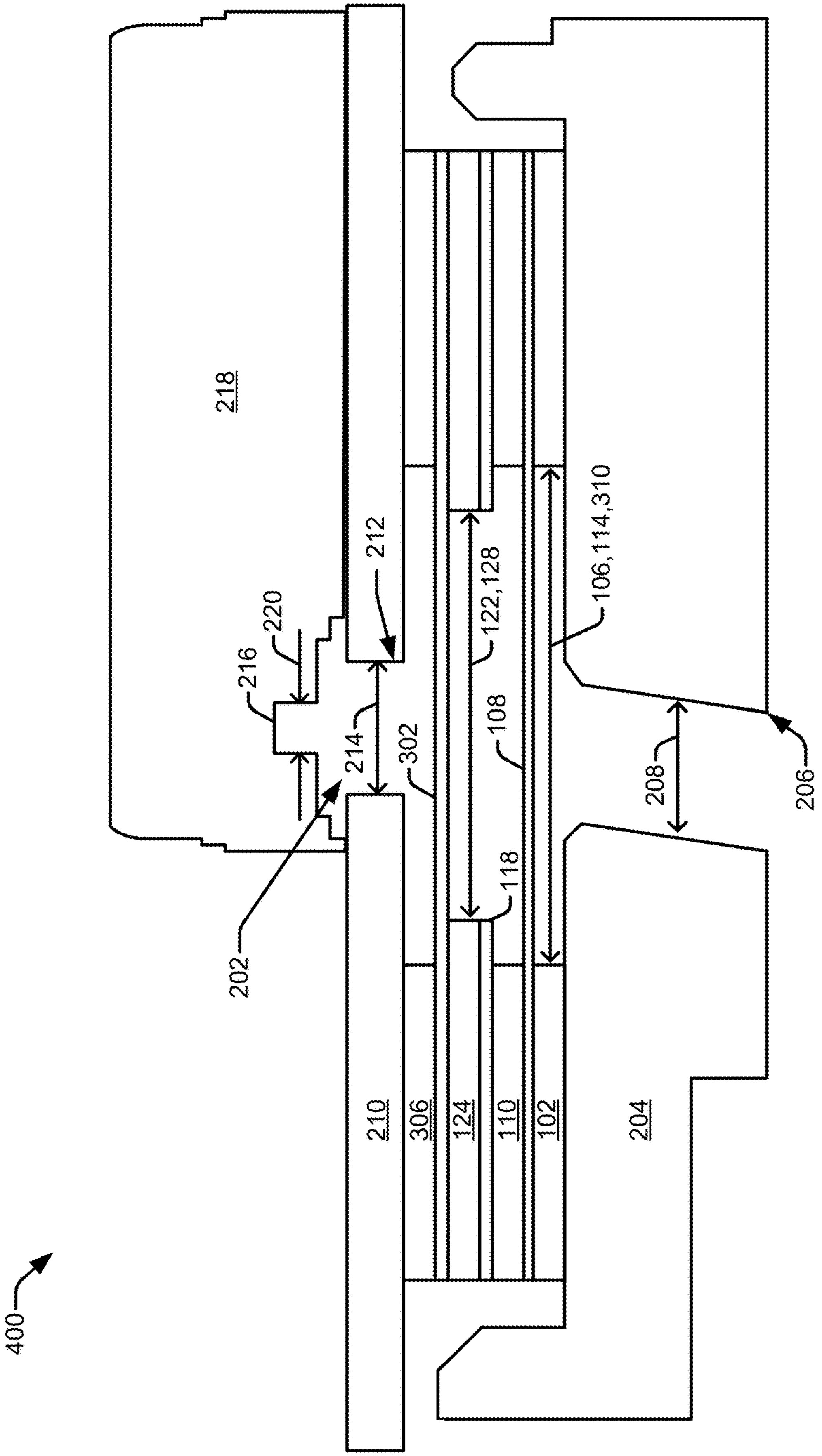
FIG. 4 illustrates a cross-sectional view of an example impedance-tuned microphone tunnel.

FIG. 4 illustrates a system 400 that includes a first layer of adhesive 102, a waterproof membrane 108, a second layer of adhesive 110, a ring 118, a third layer of adhesive 124, an acoustic mesh 302, and a fourth layer of adhesive 306 positioned within a microphone tunnel 202 of an electronic device. The system 400 includes a housing (e.g., enclosure) 204 that includes a first aperture 206 having a first aperture diameter 208. The first aperture 206 is configured to enable sound waves to enter the microphone tunnel 202 within the housing 204. The first layer of adhesive 102 couples the waterproof membrane 108 to the housing 204. Only a portion of the housing 204 is illustrated in FIG. 2 for clarity purposes.

The system 400 includes a PCB 210 and a MEMS 218 positioned within the housing 204. A microphone inlet 216 having an inlet diameter 220 is formed in the MEMS 218. The PCB 210 includes a second aperture 212 substantially axially aligned with the first aperture 206 in the housing 204. The second aperture 212 has a second aperture diameter 214 that may be substantially identical to the first aperture diameter 208 of the first aperture 206. As the first and second apertures 206, 212 are substantially axially aligned, sound waves exterior of the housing 204 may enter the microphone tunnel 202 through the first aperture 206 and travel to the microphone inlet 216.

As discussed herein, the third and fourth diameters 122, 128 of the third and fourth central openings 120, 126 of the ring 118 and third layer of adhesive 124 may tune an impedance of the microphone tunnel 202. The third and fourth diameters 122, 128 of the third and fourth central openings 120, 126 (shown also in FIG. 1) being smaller than diameters (e.g., the first, second, and fifth diameters 106, 114, 310) of other central openings (e.g., the first, second, and fifth central openings 104, 112, 308) may be used to tune the impedance of the microphone tunnel 202 to reduce a resonant peak of the microphone tunnel 202. The smaller diameters 122, 128 may reduce the peak resonance of the microphone tunnel 202 as shown in FIG. 5.

Figure 5:
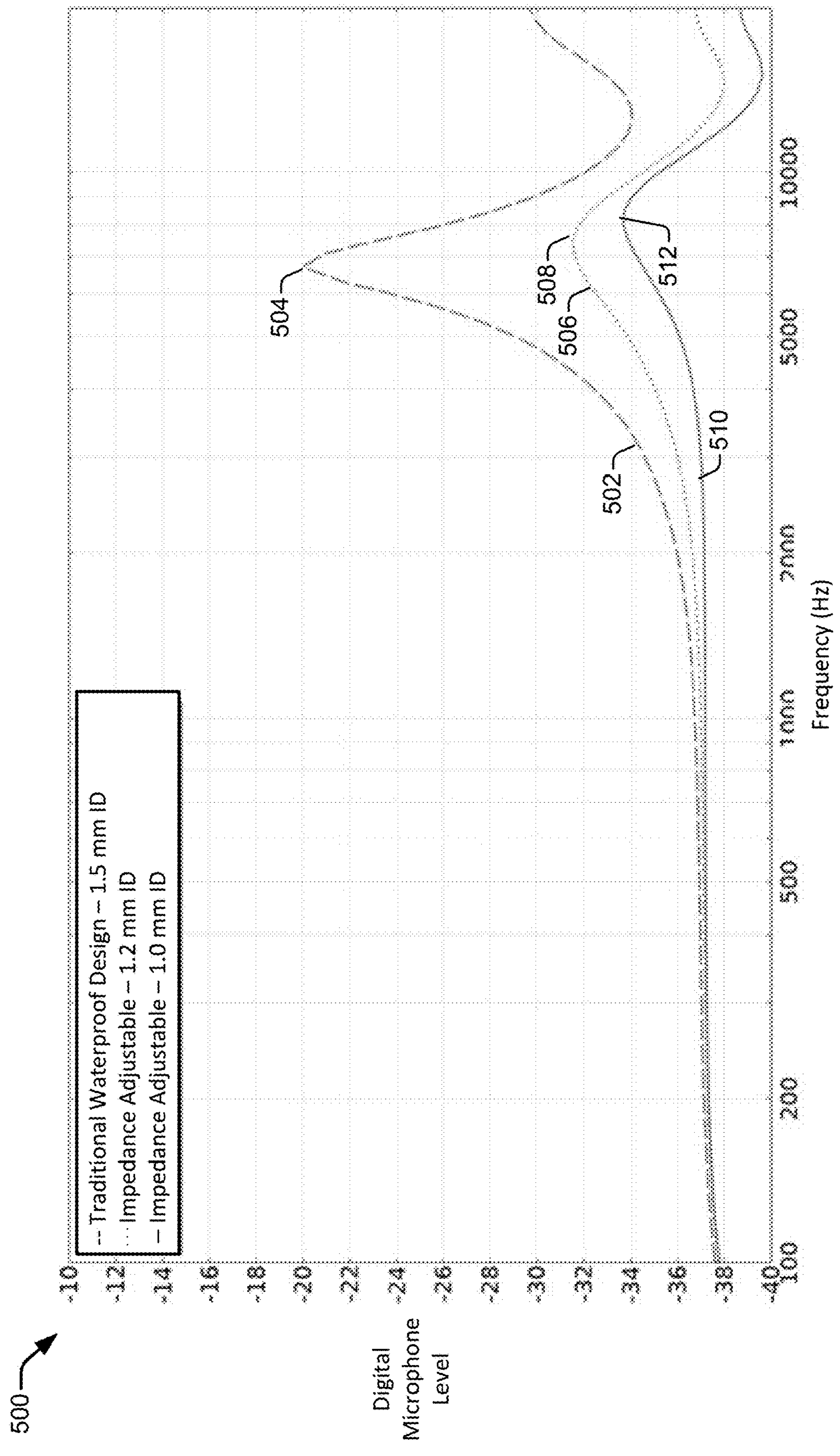
FIG. 5 is a graph that illustrates a reduction of peak resonance with an impedance-tuned microphone tunnel.

FIG. 5 is a graph 500 that illustrates a reduction of peak resonance with an impedance-tuned microphone tunnel. A resonant peak is a frequency spike in an audio signal that occurs when sound waves resonate within a cavity, such as a microphone tunnel 202. A large resonant peak may negatively affect audio quality. The graph 500 illustrates an impedance 502 of a microphone tunnel 202 having a large resonant peak 504. The impedance 502 is for a microphone tunnel 202 without a ring 118 being positioned within the microphone tunnel 202, the ring 118 having a central opening with a reduced diameter as compared to other central openings within the microphone tunnel 202. The impedance 502 shown in FIG. 5 is for a microphone tunnel 202 having a central passageway with a substantially constant 1.5-millimeter diameter.

The graph 500 illustrates an impedance 506 for a microphone tunnel 202 that includes a ring 118 having a central opening with a diameter of 1.2 millimeters to reduce a portion of the diameter of the central passageway through the microphone tunnel 202. As shown in the graph 500, the reduced diameter of 1.2 millimeters for a portion of the passageway through the microphone tunnel 202 results in a reduced resonant peak 508 with respect to the resonant peak 504 of the microphone tunnel 202 with the central passageway having the substantially constant diameter of 1.5 millimeters.

The graph 500 illustrates an impedance 510 for a microphone tunnel 202 that includes a ring 118 having a central opening with a diameter of 1.0 millimeters to reduce a portion of the diameter of the central passageway through the microphone tunnel 202. As shown in the graph 500, the reduced diameter of 1.0 millimeters for a portion of the passageway through the microphone tunnel 202 results in a reduced resonant peak 512 with respect to the resonant peak 504 of the microphone tunnel 202 with the central passageway having the substantially constant diameter of 1.5 millimeters. Further, the reduced diameter of 1.0 millimeters reduces the resonant peak 512 with respect to the resonant peak 508 of the microphone tunnel 202 that includes the central passageway having the reduced diameter of 1.2 millimeters. As shown by the graph 500, an impedance of a microphone tunnel 202 may be tuned to a frequency response target by including a ring 118 within the microphone tunnel 202 that has a central opening with a reduced diameter 122 that may be varied.

CONCLUSION

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

Terms such as "above," "below," or "underneath" are not intended to require any particular orientation of a device. Rather, a first layer or component being provided "above" a second layer or component is intended to describe the first layer being at a higher Z-dimension than the second layer or component within the particular coordinate system in use. It will be understood that should the component be provided in another orientation, or described in a different coordinate system, then such relative terms may be changed.

Although implementations for an impedance-tuned microphone tunnel have been described in language specific to certain features and/or methods, the subject of the appended claims is not necessarily limited to the specific features or methods described. Rather, the specific features and methods are disclosed as example implementations for an impedance-tuned microphone tunnel.

What is claimed is:

1. An apparatus comprising:
- a first layer of adhesive including a first central opening having a first diameter;
- a second layer of adhesive including a second central opening having a second diameter, the second diameter being substantially equal to the first diameter;
- a waterproof membrane positioned between the first layer of adhesive and the second layer of adhesive, the waterproof membrane having a first outer diameter, the first outer diameter being larger than the first diameter and the second diameter; and
- a ring-like structure including a third central opening having a third diameter, the ring-like structure disposed on the second layer of adhesive effective to couple the ring-like structure to the waterproof membrane, the third diameter being smaller than the first and second diameters.

2. The apparatus of claim 1, wherein:
- the third central opening is a circle, ellipse, or hexagonal in shape; and
- the third diameter is a smallest diameter of the third central opening.

3. The apparatus of claim 1, wherein:
- the third central opening is a circle, ellipse, or hexagonal in shape; and
- the third diameter is a larger diameter of the third central opening.

4. The apparatus of claim 1, further comprising:
- a third layer of adhesive including a fourth central opening having a fourth diameter, the fourth diameter being substantially equal to the third diameter;
- an acoustic mesh, the third layer of adhesive effective to couple the acoustic mesh to the ring-like structure, the acoustic mesh having a second outer diameter substantially equal to the first outer diameter; and
- a fourth layer of adhesive including a fifth central opening having a fifth diameter, the fifth diameter being substantially equal to the first and second diameters.

5. The apparatus of claim 4, wherein the ring-like structure is coated with a non-stick material.

6. The apparatus of claim 5, wherein the non-stick material is polyethylene terephthalate, biaxially orientated polyethylene terephthalate, or polyimide.

7. The apparatus of claim 5, wherein the first, second, and fifth diameters are at least 1.5 millimeters.

8. The apparatus of claim 7, wherein the third and fourth diameters are 1.2 millimeters.

9. The apparatus of claim 7, wherein the third and fourth diameters are 1.0 millimeters.

10. The apparatus of claim 1, further comprising:

a housing including a first aperture having a first aperture diameter;

a microphone inlet having an inlet diameter, the microphone inlet being positioned within the housing and being substantially axially aligned with the first aperture, wherein the microphone inlet is formed in a micro-electromechanical system (MEMS);

a printed circuit board (PCB) coupled to the MEMS, the PCB including a second aperture having a second aperture diameter, the second aperture being substantially axially aligned with the first aperture and the microphone inlet; and a microphone tunnel that extends from the first aperture to the microphone inlet, a portion of the PCB being positioned within the microphone tunnel, wherein the first layer of adhesive and the waterproof membrane are positioned within the microphone tunnel, the first layer of adhesive further effective to couple the waterproof membrane to the housing.

11. The apparatus of claim 10, further comprising:

a third layer of adhesive positioned within the microphone tunnel, the third layer of adhesive including a fourth central opening having a fourth diameter, the fourth diameter being substantially equal to the third diameter, wherein the ring-like structure is positioned with the microphone tunnel, the third layer of adhesive effect to couple the ring-like structure to the PCB.

12. The apparatus of claim 10, further comprising:

a third layer of adhesive positioned within the microphone tunnel, the third layer of adhesive including a fourth central opening having a fourth diameter, the fourth diameter being substantially equal to the third diameter;

an acoustic mesh positioned with the microphone tunnel, the third layer of adhesive coupling the acoustic mesh to the ring-like structure, the acoustic mesh having a second outer diameter that is substantially equal to the first outer diameter of the waterproof membrane; and a fourth layer of adhesive positioned within the microphone tunnel, the fourth layer of adhesive including a fifth central opening having a fifth diameter, the fifth diameter being substantially equal to the first and second diameters, the fourth layer of adhesive coupling the acoustic mesh to the PCB, wherein the ring-like structure is positioned with the microphone tunnel, the third layer of adhesive effective to couple the ring-like structure to the acoustic mesh.

* * * * *